United States Patent
Holtzman et al.

(10) Patent No.: US 8,396,208 B2
(45) Date of Patent: *Mar. 12, 2013

(54) MEMORY SYSTEM WITH IN STREAM DATA ENCRYPTION/DECRYPTION AND ERROR CORRECTION

(75) Inventors: Michael Holtzman, Cupertino, CA (US); Baruch Boris Cohen, Carmiel (IL); Muhammed Rijwane ul Islam, Santa Clara, CA (US); Matthew Davidson, Mountain View, CA (US)

(73) Assignee: SanDisk Technologies Inc., Plano, TX (US)

( * ) Notice: Subject to any disclaimer, the term of this patent is extended or adjusted under 35 U.S.C. 154(b) by 921 days.

This patent is subject to a terminal disclaimer.

(21) Appl. No.: 11/313,428

(22) Filed: Dec. 20, 2005

(65) Prior Publication Data
US 2006/0239449 A1   Oct. 26, 2006

Related U.S. Application Data

(60) Provisional application No. 60/638,485, filed on Dec. 21, 2004.

(51) Int. Cl.
*H04L 9/28* (2006.01)

(52) U.S. Cl. ........... 380/28; 380/277; 380/278; 713/189

(58) Field of Classification Search ............ 380/28
See application file for complete search history.

(56) References Cited

U.S. PATENT DOCUMENTS

| | | | | |
|---|---|---|---|---|
| 4,375,664 A * | 3/1983 | Kim | | 714/52 |
| 4,506,362 A * | 3/1985 | Morley | | 714/6.1 |
| 4,506,365 A * | 3/1985 | Collins | | 714/766 |
| 5,438,575 A * | 8/1995 | Bertrand | | 714/799 |
| 6,158,004 A * | 12/2000 | Mason et al. | | 713/150 |
| 6,513,719 B1 | 2/2003 | Imura | | |
| 6,754,765 B1 | 6/2004 | Chang et al. | | |
| 6,829,676 B2 * | 12/2004 | Maeda et al. | | 711/103 |
| 6,832,731 B2 * | 12/2004 | Kaneko | | 235/492 |
| 6,928,599 B2 * | 8/2005 | Edlis et al. | | 714/752 |

(Continued)

FOREIGN PATENT DOCUMENTS

EP   1074906 A1   2/2001
JP   1989-002136 A   1/1989

(Continued)

OTHER PUBLICATIONS

Notification of Transmittal of the International Search Report and the Written Opinion of the International Searching Authority, or the Declaration, in corresponding PCT/US2005/046688, dated Sep. 19, 2006, 14 pages.

(Continued)

*Primary Examiner* — Kambiz Zand
*Assistant Examiner* — Yonas Bayou
(74) *Attorney, Agent, or Firm* — Brinks Hofer Gilson & Lione

(57) ABSTRACT

The throughput of the memory system is improved where error correction of data in a data stream is cryptographically processed with minimal involvement of any controller. To perform error correction when data from the memory cells are read, the bit errors in the data in the data stream passing between the cells and the cryptographic circuit are corrected prior to any cryptographic process performed by the circuit. Preferably the error correction occurs in one or more buffers employed to buffer the data between the cryptographic circuit and the memory where latency is reduced by using multiple buffers.

12 Claims, 3 Drawing Sheets

U.S. PATENT DOCUMENTS

| | | | |
|---|---|---|---|
| 7,036,020 | B2 | 4/2006 | Thibadeau |
| 7,062,616 | B2 * | 6/2006 | Sadhasivan et al. ........... 711/153 |
| 7,180,843 | B2 * | 2/2007 | Furuta et al. ................ 369/59.22 |
| 7,215,771 | B1 | 5/2007 | Hamlin |
| 7,426,747 | B2 | 9/2008 | Thibadeau |
| 7,493,656 | B2 | 2/2009 | Goodwill et al. |
| 2001/0016875 | A1 * | 8/2001 | Schwartz et al. ............. 709/206 |
| 2001/0018741 | A1 | 8/2001 | Hogan |
| 2002/0169960 | A1 | 11/2002 | Iguchi et al. |
| 2002/0174337 | A1 * | 11/2002 | Aihara .......................... 713/172 |
| 2002/0188812 | A1 * | 12/2002 | Sadhasivan et al. ........... 711/153 |
| 2003/0016875 | A1 * | 1/2003 | Kobayashi et al. ............ 382/239 |
| 2003/0018664 | A1 * | 1/2003 | Wee et al. ................... 707/501.1 |
| 2003/0085289 | A1 * | 5/2003 | Kaneko ......................... 235/492 |
| 2003/0097344 | A1 | 5/2003 | Chaum et al. |
| 2003/0097655 | A1 * | 5/2003 | Novak ............................ 725/31 |
| 2003/0196028 | A1 * | 10/2003 | Maeda et al. ................. 711/103 |
| 2003/0233545 | A1 | 12/2003 | Eldar et al. |
| 2004/0105549 | A1 * | 6/2004 | Suzuki et al. ................. 380/278 |
| 2004/0139380 | A1 | 7/2004 | Sako |
| 2004/0153918 | A1 | 8/2004 | Tanaka et al. |
| 2004/0172538 | A1 | 9/2004 | Satoh et al. |
| 2004/0223618 | A1 * | 11/2004 | Dellow .......................... 380/277 |
| 2004/0250092 | A1 * | 12/2004 | Hori et al. ..................... 713/189 |
| 2005/0060602 | A1 * | 3/2005 | Battaia .............................. 714/5 |
| 2005/0063265 | A1 | 3/2005 | Akiyama |
| 2005/0273618 | A1 | 12/2005 | Takemura et al. |
| 2006/0031722 | A1 | 2/2006 | Kolvick et al. |
| 2006/0036897 | A1 * | 2/2006 | Lin et al. ............................ 714/5 |
| 2006/0107047 | A1 * | 5/2006 | Bar-El .......................... 713/168 |
| 2006/0232826 | A1 * | 10/2006 | Bar-El .......................... 358/403 |
| 2006/0262928 | A1 * | 11/2006 | Bar-El et al. .................. 380/228 |
| 2006/0294236 | A1 | 12/2006 | Bar-El |
| 2006/0294513 | A1 | 12/2006 | Bar-El et al. |

FOREIGN PATENT DOCUMENTS

| | | | |
|---|---|---|---|
| JP | 1999-003284 | A | 1/1999 |
| JP | 2001-051903 | A | 2/2001 |
| JP | 2001-508893 | A | 7/2001 |
| JP | 2002-229861 | A | 8/2002 |
| JP | 2002-329180 | A | 11/2002 |
| JP | 2004-110253 | | 4/2004 |
| WO | WO 98/26535 | | 6/1998 |

OTHER PUBLICATIONS

Office Action for U.S. Appl. No. 11/313,447, 13 pages, Apr. 14, 2009.
Invitation to Pay Additional Fees and a Partial International Search Report for PCT/US2005/046586, dated Jul. 11, 2006, 8 pages.
Notification of Transmittal of the International Search Report and the Written Opinion of the International Searching Authority, or the Declaration for PCT/US2005/046586, dated Oct. 12, 2006, 5 pages.
Office Action for U.S. Appl. No. 11/314,030, dated Mar. 30, 2010, 14 pages.
Office Action for U.S. Appl. No. 11/314,032, dated Mar. 30, 2010, 15 pages.
Office Action for U.S. Appl. No. 11/314,030, dated Dec. 9, 2010, 20 pages.
Search Report for European Patent Application Serial No. 10177325.7, dated Dec. 27, 2010, 4 pages.
Office Action for Japanese Patent Application Serial No. JP 2007-548469, dated Mar. 21, 2012, 9 pages.
Office Action for Korean Patent Application Serial No. KR 10-2007-7016699, dated Jun. 20, 2012, 6 pages.
Office Action for Korean Patent Application Serial No. KR 10-2007-7016700, dated Jun. 19, 2010, 5 pages.
Office Action for Taiwanese Patent Application Serial No. 094145713, dated Mar. 26, 2012, 20 pages.
Search Report for European Patent Application Serial No. EP10182649, dated Apr. 1, 2011, 5 pages.
Office Action for Japanese Patent Application Serial No. 2007-548469, dated May 17, 2011, 22 pages.
Office Action for Japanese Patent Application Serial No. 2007-548490, dated Jun. 14, 2011, 7 pages.
Office Action for Japanese Patent Application Serial No. 2007-548490, dated Feb. 7, 2012, 5 pages.
Office Action for Chinese Patent Application Serial No. 200580048239.5, dated Sep. 27, 2012, 5 pages.
Office Action for Japanese Patent Application Serial No. 2007-548490, dated Sep. 4, 2012, 2 pages.
Office Action for Taiwanese Patent Application Serial No. 094145661, dated Sep. 12, 2012, 15 pages.

* cited by examiner

MEMORY SYSTEM WITH IN STREAM DATA ENCRYPTION/DECRYPTION AND ERROR CORRECTION

CROSS-REFERENCE TO RELATED APPLICATIONS

This application claims the benefit of U.S. Provisional Application No. 60/638,485, filed Dec. 21, 2004, entitled, "Memory System with In Stream Data Encryption/Decryption and Error Correction." This application is further related to U.S. patent application Ser. No. 11/313,447, entitled, "In Stream Data Encryption/Decryption and Error Correction Method," filed on the same day as the present application. These applications are incorporated in their entirety by reference as if fully set forth herein.

BACKGROUND OF THE INVENTION

This invention relates in general to memory systems, and in particular to a memory system with in stream data encryption/decryption and error correction.

The mobile device market is developing in the direction of including content storage so as to increase the average revenue by generating more data exchanges. This means that the content has to be protected when stored on a mobile device.

Portable storage devices are in commercial use for many years. They carry data from one computing device to another or to store back-up data. More sophisticated portable storage devices, such as portable hard disc drives, portable flash memory disks and flash memory cards, include a microprocessor for controlling the storage management.

In order to protect the contents stored in the portable storage devices, the data stored is typically encrypted and only authorized users are allowed to decrypt the data.

Since there may be bit errors in the data stored in portable storage devices, it is desirable to employ error correction. Current schemes for error correction may not be compatible with portable storage devices with cryptographic capabilities. It is therefore desirable to provide an improved local storage device where such difficulties are alleviated.

SUMMARY OF THE INVENTION

The data stored in the memory cells may contain errors for a number of reasons. It is therefore common to perform error correction when data from the memory cells are read. Error correction may also detect the positions of the errors in the data stream. The cryptographic processes performed by a circuit may shift the positions of the bits in the data stream so that if the bit errors in the data stream have not been corrected when such processes are performed, information on the positions of the bit errors will no longer be accurate after the processes so that error correction may no longer be possible after the cryptographic processes have been performed. Thus one aspect of the invention is based on the recognition that the bit errors in the data in the data stream passing between the cells and the cryptographic circuit are preferably corrected prior to any cryptographic process performed by the circuit. Preferably, at least one buffer is used to store data in the data stream passing between the cells and the circuit and any error or errors in the data stored in the buffer and originating from the cells are corrected prior to cryptographic processing of the data by the circuit.

BRIEF DESCRIPTION OF THE DRAWINGS

For convenience in description, identical components are labeled by the same numbers in this application.

DETAILED DESCRIPTION OF EXEMPLARY EMBODIMENTS

Figure 1:
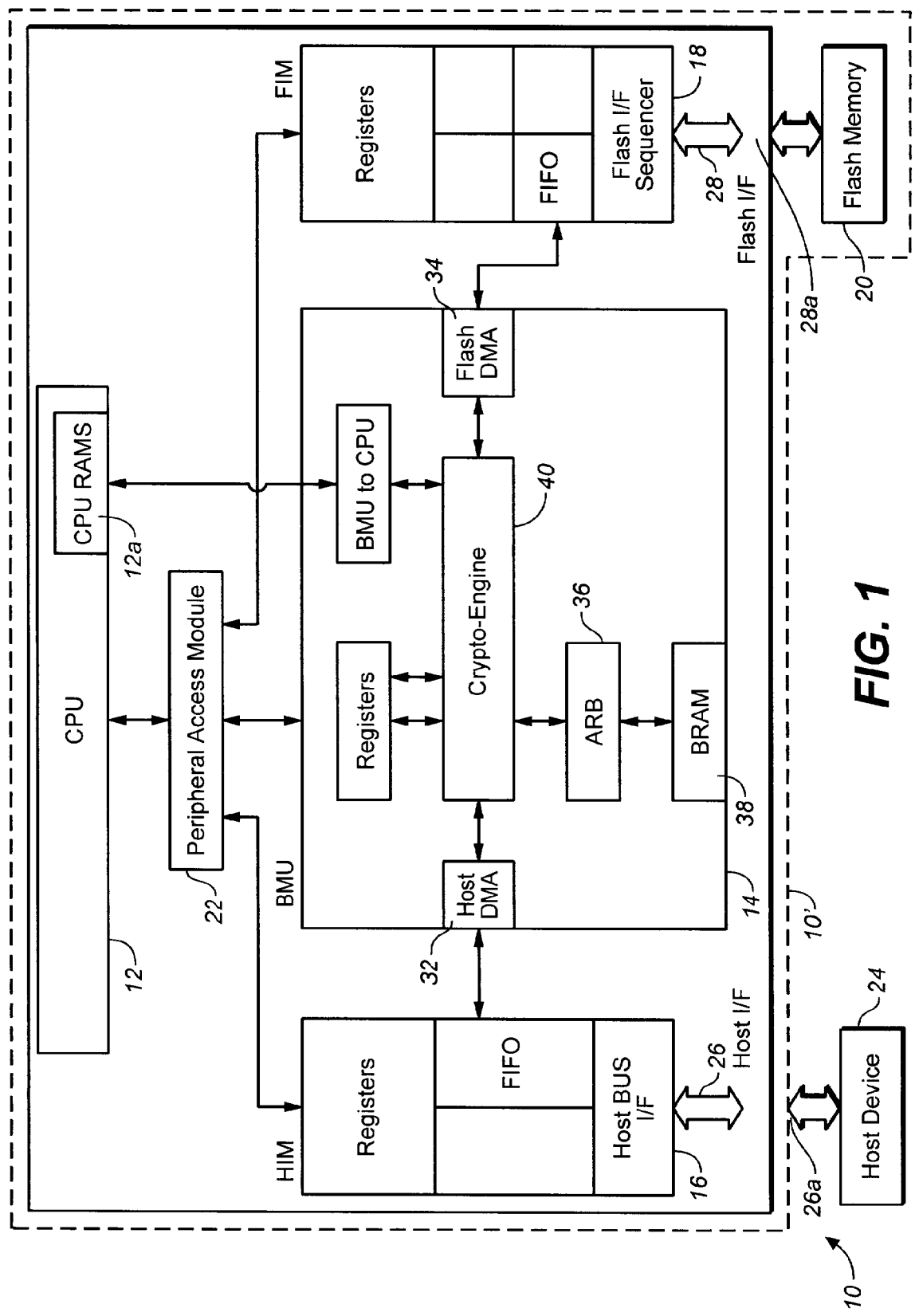
FIG. 1 is a block diagram of a memory system in communication with a host device to illustrate the invention.

An example memory system in which the various aspects of the present invention may be implemented is illustrated by the block diagram of FIG. 1. As shown in FIG. 1, the memory system 10 includes a central processing unit (CPU) 12, a buffer management unit (BMU) 14, a host interface module (HIM) 16 and a flash interface module (FIM) 18, a flash memory 20 and a peripheral access module (PAM) 22. Memory system 10 communicates with a host device 24 through a host interface bus 26 and port 26a. The flash memory 20 which may be of the NAND type, provides data storage for the host device 24. The software code for CPU 12 may also be stored in flash memory 20. FIM 18 connects to the flash memory 20 through a flash interface bus 28 and port 28a. HIM 16 is suitable for connection to a host system like a digital camera, personal computer, personal digital assistant (PDA), digital media player, MP-3 player, and cellular telephone or other digital devices. The peripheral access module 22 selects the appropriate controller module such as FIM, HIM and BMU for communication with the CPU 12. In one embodiment, all of the components of system 10 within the dotted line box may be enclosed in a single unit such as in memory card or stick 10' and preferably encapsulated in the card or stick.

The buffer management unit 14 includes a host direct memory access (HDMA) 32, a flash direct memory access (FDMA) controller 34, an arbiter 36, a buffer random access memory (BRAM) 38 and a crypto-engine 40. The arbiter 36 is a shared bus arbiter so that only one master or initiator (which can be HDMA 32, FDMA 34 or CPU 12) can be active at any time and the slave or target is BRAM 38. The arbiter is responsible for channeling the appropriate initiator request to the BRAM 38. The HDMA 32 and FDMA 34 are responsible for data transported between the HIM 16, FIM 18 and BRAM 38 or the CPU random access memory (CPU RAM) 12a. The operation of the HDMA 32 and of the FDMA 34 is conventional and need not be described in detail herein. The BRAM 38 is used to buffer data passed between the host device 24, flash memory 20 and the CPU RAM 12a. The HDMA 32 and FDMA 34 are responsible for transferring the data between HIM 16/FIM 18 and BRAM 38 or the CPU RAM 12a and for indicating sector transfer completion. As will be described below, the FIM 18 also has the capability of detecting errors in the data read from the flash memory 20 and notifying the CPU 12 when errors are discovered.

First when data from flash memory 20 is read by the host device 24, encrypted data in memory 20 is fetched through bus 28, FIM 18, FDMA 34, crypto engine 40 where the encrypted data is decrypted and stored in BRAM 38. The decrypted data is then sent from BRAM 38, through HDMA 32, HIM 16, bus 26 to the host device 24. The data fetched from BRAM 38 may again be encrypted by means of crypto engine 40 before it is passed to HDMA 32 so that the data sent to the host device 24 is again encrypted but by means of a different key and/or algorithm compared to those whereby the data stored in memory 20 is decrypted. Preferably, and in an alternative embodiment, rather than storing decrypted data in BRAM 38 in the above-described process, which data may become vulnerable to unauthorized access, the data from memory 20 may be decrypted and encrypted again by crypto engine 40 before it is sent to BRAM 38. The encrypted data in BRAM 38 is then sent to host device 24 as before. This illustrates the data stream during a reading process.

When data is written by host device 24 to memory 20, the direction of the data stream is reversed. For example if unencrypted data is sent by host device, through bus 26, HIM 16, HDMA 32 to the crypto engine 40, such data may be encrypted by engine 40 before it is stored in BRAM 38. Alternatively, unencrypted data may be stored in BRAM 38. The data is then encrypted before it is sent to FDMA 34 on its way to memory 20. Where the data written undergoes multi-stage cryptographic processing, preferably engine 40 completes such processing before the processed data is stored in BRAM 38.

While the memory system 10 in FIG. 1 contains a flash memory, the system may alternatively contain another type of non-volatile memory instead, such as magnetic disks, optical CDs, as well as all other types of rewrite-able non volatile memory systems, and the various advantages described above will equally apply to such alternative embodiment. In the alternative embodiment, the memory is also preferably encapsulated within the same physical body (such as a memory card or stick) along with the remaining components of the memory system.

Error Correction

Figure 2:
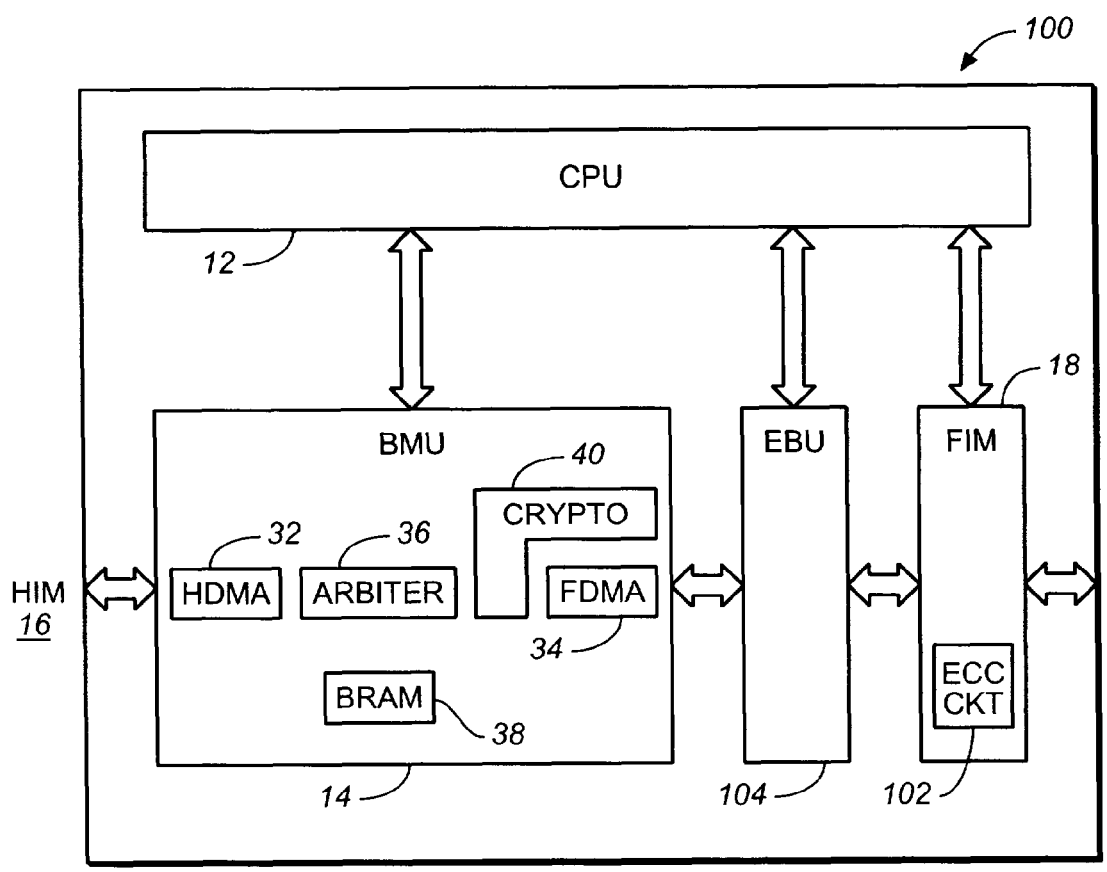
FIG. 2 is a block diagram of some of the blocks of the memory system in FIG. 1.

Data stored in a non-volatile (e.g. flash) memory may become corrupted and contain errors. For this reason, FIM 18 may contain an error correction (ECC) circuit 102 that detects which bit or bits of the data stream from memory 20 contain errors, including the locations of the errors in the bit stream. This is illustrated in FIG. 2, which is a block diagram of a memory system 100 to illustrate another aspect of the invention. FIM 18 sends an interrupt signal to CPU 12 when error(s) is detected in the bit stream, and circuit 102 sends information concerning the locations of the bits in error to CPU 12. In conventional memory systems without cryptographic features, the errors are corrected by the CPU in BRAM 38. However, if the data from the data stream is first cryptographically processed before the correction is made, the cryptographic process(es) may cause the locations and/or value(s) of the data bits in the processed data stream to change, so that the location(s) and/or value(s) of the bit errors after the cryptographic processing may be different from those sent to the CPU 12 by circuit 102. This may render it impossible to correct the errors when the cryptographically processed data reach the BRAM 38. An aspect of the invention stems from the recognition that the error(s) detected is corrected before the data is cryptographically processed, so that this problem is avoided.

An error buffer unit (EBU) 104 is used to store data from the data stream passing between the BMU 14 and FIM 18, so that when the CPU 12 receives an interrupt from FIM 18 indicating the presence of error(s) in the data stream, the CPU corrects the error(s) in EBU 104, instead of at the BRAM 38. To correct digital data, the bits in error are simply "flipped" (i.e. turning "1" to "0" and "0" to "1") at the locations of error(s) detected by circuit 102.

Figure 3:
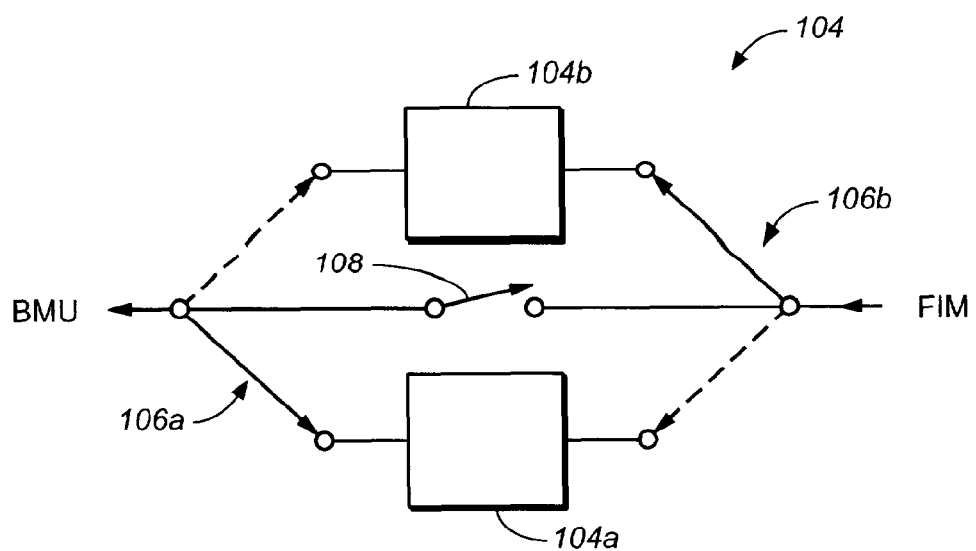
FIG. 3 is a circuit diagram illustrating in more detail a preferred configuration of the error correction buffer unit of FIG. 2.

In order to reduce the amount of interruption in the data stream when errors are detected, two or more buffers may be employed in the EBU 104, such as shown in FIG. 3. As shown in FIG. 3, two buffers 104a and 104b are used, where one of the two buffers is receiving data from the memory 20 through FIM 18 and the other is sending data to the Crypto-Engine 40 through FDMA 34 in BMU 14. In FIG. 3, two switches 106a and 106b are used. When the two switches are in the solid line positions as shown in FIG. 3, buffer 104a is supplying data to the BMU 14 and buffer 104b is receiving data from FIM 18. When the two switches are in the dotted line positions as shown in FIG. 3, buffer 104b is supplying data to the BMU 14 and buffer 104a is receiving data from FIM 18. Each of the buffers can first be filled with data before data stored in it is sent to the BMU. The CPU corrects the error(s) in the buffer(s) 104a and 104b when data is sent from or received by them. In this manner, the only latency is the time required to fill one of the two buffers when the data stream is started. After that, there will be no interruption in the data stream even when error(s) have been detected by circuit 102, if the time taken by the CPU to correct the error(s) is small compared to the time needed to fill each buffer.

If correcting the data takes longer then filling a buffer, the data stream will be interrupted only when errors are detected and the data stream will flow without interruption when no errors are detected. A buffer-empty signal (not shown) connecting between the EBU 104 and the FDMA 34 signals the latter that the data stream is interrupted and no more data is available. The FDMA 34 as well as the crypto engine 40 will then pause and wait for the data stream to resume.

When data is written by the host device 24 to memory 20, there may be no need for error correction, so that it would be desirable to bypass the EBU. This may be accomplished by switch 108. When switch 108 is closed, the data from HIM 16 (not completely shown in FIG. 2) simply bypasses the two buffers 104a and 104b. Switch 108 may also be closed in a bypass mode where no cryptographic processing is needed when data is read from or written to memory 20. In this mode, HDMA and FDMA are connected directly to arbiter 36 as if crypto-engine 40 is eliminated from system 10, and the data stream bypasses both the EBU 104 and the Crypto-Engine 40. This may be accomplished also by using switches. Hence, in the bypass mode, a logic circuit (not shown) in system 100 under the control of CPU 12 causes the data stream to bypass block 40 and causes switch 108 to close.

Figure 4:
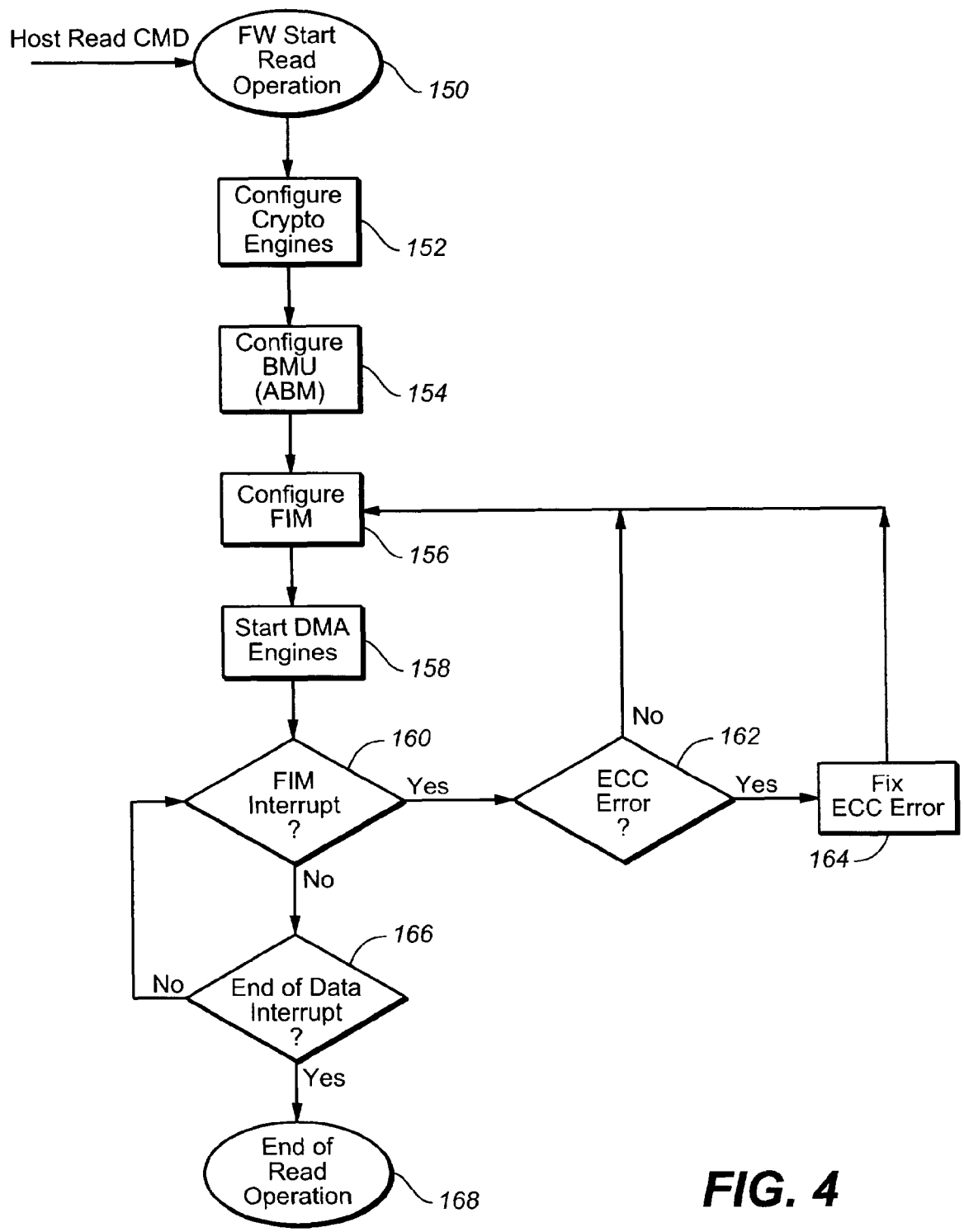
FIG. 4 is a flow chart illustrating the operation of the system in FIG. 2 to illustrate the preferred embodiment of one aspect of the invention.

The error correction process is illustrated by the flow chart of FIG. 4. The CPU 12 starts a read operation after receiving a read command from the host device 24 (ellipse 150). It then configures the Crypto-Engine 40 by writing appropriate security configuration information or record to register 52, and configures the BMU 14 for a reading operation, and other parameters such as the allocation of memory space in BRAM 38 for the operation (blocks 152, 154). It also configures the FIM 18, such as by specifying the locations in memory 20 where data is to be read (block 156). The HDMA and FDMA engines 32 and 34 are then started. See Block 158. When the CPU receives an interrupt, it checks to see whether it is a FIM interrupt (diamond 160). When a FIM interrupt is received, the CPU checks to see whether the interrupt is one indicating that there is one or more errors in the data stream (162). If error(s) is indicated, it proceeds to correct the error(s) (block 164) in buffers 104a and/or 104b and returns to configure the FIM 18 to change the locations in memory 20 where data is to be read next (block 156). When the FIM interrupt does not indicate error(s) in the data stream, it means the FIM has completed its operation and the CPU also returns to block 156 to re-configure and restart the FIM. If the interrupt detected by the CPU is not a FIM interrupt, it checks to see if it is an end of data interrupt (diamond 166). If it is, then the read operation ends (ellipse 168). If not, this interrupt is irrelevant to the cryptographic processing of the data (i.e. clock interrupt) and the CPU 12 services it (not shown) and returns to diamond 160 to check for interrupts.

FIG. 4 needs only to be modified slightly for a write operation. Since there is no handling of ECC errors in the data to be written to memory 20, the CPU 12 can skip the processes in diamond 162 and block 164 in a write operation. If a FIM interrupt is received by the CPU 12 during a write operation, this means that the FIM completed its operation and the CPU also returns to block 156 to re-configure the FIM. Aside from this difference, the write operation is substantially similar to the read operation.

While the invention has been described above by reference to various embodiments, it will be understood that changes and modifications may be made without departing from the scope of the invention, which is to be defined only by the appended claims and their equivalent. All references referred to herein are incorporated by reference.

The invention claimed is:

1. A memory system comprising:
    non-volatile memory;
    a circuit operative to detect a presence of one or more error(s) in data read from the non-volatile memory and further operative to generate a signal indicating the presence of the one or more error(s) in the data;
    a cryptographic circuit operative to perform cryptographic processes on the data;
    at least one buffer operative to store the data read from the non-volatile memory before the data is sent to the cryptographic circuit; and
    a processor operative to receive the signal indicating the presence of the one or more error(s) in the data and, in response to receiving the signal, correct the one or more error(s) in the data stored in the at least one buffer before the data is sent from the at least one buffer to the cryptographic circuit;
    wherein a portion of a data stream from the non-volatile memory to the cryptographic circuit is first error detected and later cryptographically processed, and wherein while one portion of the data stream is being error detected, another portion of the data stream is being cryptographically processed.

2. The memory system of claim 1, wherein the at least one buffer comprises two buffers, and wherein the processor is further operative to alternately use the two buffers to store and send data from the non-volatile memory to the cryptographic circuit.

3. The memory system of claim 2, wherein the processor is further operative to store data read from the non-volatile memory in a first one of the two buffers when data stored in a second one of the two buffers is sent to the cryptographic circuit.

4. The memory system of claim 2, wherein a data stream from the non-volatile memory to the cryptographic circuit is interrupted only when correcting one or more error(s) in data stored in a first one of the two buffers takes longer than filling a second one of the two buffers with data read from the non-volatile memory.

5. The memory system of claim 1, wherein the processor is further operative to bypass the at least one buffer when the memory system is operating in a bypass mode.

6. The memory system of claim 1, wherein a data stream from the non-volatile memory to the cryptographic circuit is interrupted when the presence of the one or more error(s) is detected and correcting the one or more error(s) takes longer than storing data in the at least one buffer.

7. A method for correcting data in a memory system, the method comprising:
    performing the following in a memory system comprising non-volatile memory, a circuit operative to detect a presence of one or more error(s) in data, a cryptographic circuit, at least one buffer, and a processor:
        storing, in the at least one buffer, data passing between the non-volatile memory and the cryptographic circuit;
        correcting one or more error(s) in the data stored in the at least one buffer prior to providing the data to the cryptographic circuit, wherein the one or more error(s) in the data are corrected by the processor in response to receiving a signal from the circuit indicating the presence of the one or more error(s); and
        after the one or more error(s) in the data stored in the at least one buffer have been corrected, providing the data to the cryptographic circuit;
    wherein a portion of a data stream from the non-volatile memory to the cryptographic circuit is first error detected and later cryptographically processed, and wherein while one portion of the data stream is being error detected, another portion of the data stream is being cryptographically processed.

8. The method of claim 6, wherein the at least one buffer comprises two buffers and wherein the method further comprises alternately using the two buffers to store and send data from the non-volatile memory to the cryptographic circuit.

9. The method of claim 7, wherein data read from the non-volatile memory is stored in a first one of the two buffers when data stored in a second one of the two buffers is sent to the cryptographic circuit.

10. The method of claim 7, wherein a data stream from the non-volatile memory to the cryptographic circuit is interrupted only when correcting one or more error(s) in data stored in a first one of the two buffers takes longer than filling a second one of the two buffers with data read from the non-volatile memory.

11. The method of claim 6 further comprising bypassing the at least one buffer when the memory system is operating in a bypass mode.

12. The method of claim 7, wherein a data stream from the non-volatile memory to the cryptographic circuit is interrupted when the presence of the one or more error(s) is detected and correcting the one or more error(s) takes longer than storing data in the at least one buffer.

\* \* \* \* \*